(12) United States Patent
Ernst et al.

(10) Patent No.: US 11,609,470 B1
(45) Date of Patent: Mar. 21, 2023

(54) WRITING DEVICE INCLUDING CHOLESTERIC LIQUID CRYSTAL AND HAVING SECTIONAL ERASE

(71) Applicant: KENT DISPLAYS, INC., Kent, OH (US)

(72) Inventors: Todd Ernst, Kent, OH (US); Don Davis, Kent, OH (US); Duane Marhefka, Kent, OH (US); Nathan Hirt, Kent, OH (US); Anthony Daniels, Kent, OH (US); Clinton Braganza, Kent, OH (US)

(73) Assignee: Kent Displays, Inc., Kent, OH (US)

( * ) Notice: Subject to any disclaimer, the term of this patent is extended or adjusted under 35 U.S.C. 154(b) by 0 days.

(21) Appl. No.: 17/535,758

(22) Filed: Nov. 26, 2021

(51) Int. Cl.
*G02F 1/137* (2006.01)
*G02F 1/1333* (2006.01)

(52) U.S. Cl.
CPC ...... *G02F 1/13718* (2013.01); *G02F 1/13338* (2013.01); *G02F 1/133305* (2013.01)

(58) Field of Classification Search
CPC ........... G02F 1/13718; G02F 1/133305; G02F 1/13338
USPC ........................................................ 349/12
See application file for complete search history.

(56) References Cited

U.S. PATENT DOCUMENTS

| | | | |
|---|---|---|---|
| 6,104,448 A | 8/2000 | Doane et al. | |
| 8,947,604 B2 | 2/2015 | Pishnyak | |
| 9,116,379 B2 | 8/2015 | Braganza et al. | |
| 9,229,259 B2 | 1/2016 | Montbach et al. | |
| 9,235,075 B2 | 1/2016 | Montbach et al. | |
| 9,927,672 B2 | 3/2018 | Braganza et al. | |
| 10,558,065 B2 | 2/2020 | Marhefka | |
| 2003/0071958 A1* | 4/2003 | Wu | G02F 1/133377 349/156 |
| 2010/0134706 A1* | 6/2010 | Yang | G02F 1/13718 349/23 |

(Continued)

OTHER PUBLICATIONS

U.S. Appl. No. 17/321,792, incorporated herein by reference.
U.S. Appl. No. 17/168,507, incorporated herein by reference.
U.S. Appl. No. 17/380,812, incorporated herein by reference.

*Primary Examiner* — Charles S Chang
(74) *Attorney, Agent, or Firm* — Serbinowski PLLC (57) ABSTRACT

A writing device includes a liquid crystal layer including reflective cholesteric liquid crystal material. There are electrically conductive layers between which the liquid crystal layer is disposed. At least one of the electrically conductive layers includes at least two conductive sections. There is a front substrate that is flexible and a back substrate between which the electrically conductive layers and the liquid crystal layer are disposed. Neither the front substrate nor the back substrate includes separated sections. Application of pressure to the front substrate changes a reflectivity of a portion of the cholesteric liquid crystal material to form an image. In one aspect, there is electronic erase circuitry including at least one actuator that independently applies an erase voltage waveform to each of at least two of the conductive sections. In another aspect the electronic erase circuitry includes at least one actuator that independently applies an erase voltage waveform to each of the conductive sections, and that applies erase voltage waveforms to at least two of the conductive sections in combination.

21 Claims, 5 Drawing Sheets

(56) References Cited

U.S. PATENT DOCUMENTS

2010/0265214 A1* 10/2010 Green .................. G06F 3/0412
                                                    345/173
2013/0009907 A1*  1/2013 Rosenberg ............. G06F 3/046
                                                    345/174

\* cited by examiner

WRITING DEVICE INCLUDING CHOLESTERIC LIQUID CRYSTAL AND HAVING SECTIONAL ERASE

TECHNICAL FIELD

This disclosure relates generally to writing devices including liquid crystal, and in particular, to writing devices including Cholesteric Liquid Crystal which are pressure sensitive and have sectional erase.

BACKGROUND

Figure 1:
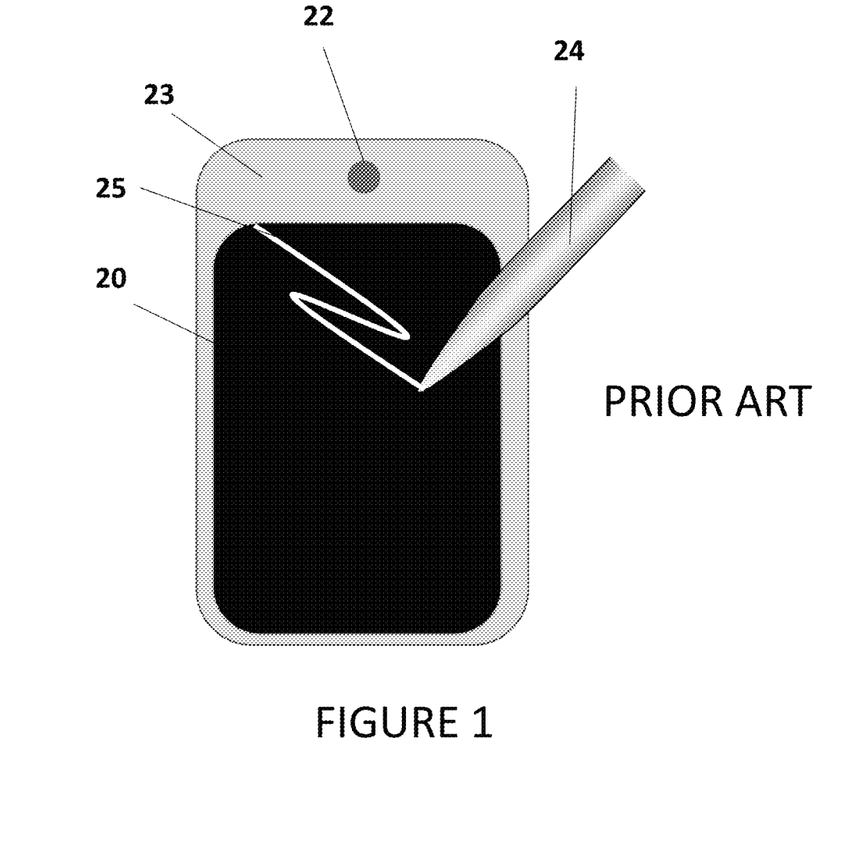
FIG. 1: Illustration of a cholesteric liquid crystal writing tablet of the Prior Art.

Appearing on the market in 2010, Kent Displays Inc.'s Boogie Board® writing device includes cholesteric liquid crystal and is pressure sensitive. As illustrated in FIG. 1, the slight pressure of a pointed stylus 24 or the fingernail is used to write or trace an image 25 on the surface of the display 20, contained in housing 23. A button 22 is pressed to erase the image as described in U.S. Pat. Nos. 6,104,448 and 9,116,379, both patents being incorporated herein by reference. In the writing device, the liquid crystal is sandwiched between two substrates that are spaced to a particular cell gap. The upper substrate is flexible and the bottom substrate is opaque, semitransparent or may be transparent with an underlying coating or deposition that is opaque or semitransparent serving as a light absorbing background. Within the cell gap is a liquid crystal layer including bistable cholesteric liquid crystal material which can exhibit two textures, an essentially transparent (focal conic) texture and a color reflective (planar) texture. The spacing of the cell gap is usually achieved by using polymer or glass spacers that are either cylindrical or spherical in shape. Spacers are also used to control pressure sensitivity as described in U.S. Pat. No. 8,947,604. In one mode known as Mode B, when one presses on the top substrate with a pointed stylus or fingernail, the liquid crystal changes its optical texture from the focal conic transparent texture to the brilliant, reflective color planar texture at the location of the stylus. The reflective color contrasts well with the opaque or semitransparent color light absorbing background below the liquid crystal layer. An image traced by the stylus or fingernail will remain on the writing device indefinitely without application of a voltage until erased. Erasure is accomplished with the writing device being cleared by applying erase voltage waveforms to transparent conducting electrodes on the inner surfaces of the substrates that drive the cholesteric liquid crystal from its color reflective state back to its focal conic transparent state. The above-described principle is disclosed in more detail in U.S. Pat. No. 6,104,448, which is incorporated herein by reference.

As disclosed in U.S. patent application Ser. No. 17/321,792, incorporated herein by reference, a cholesteric liquid crystal device can be constructed that has an optical response opposite to that described above and in U.S. Pat. No. 6,104,448. The liquid crystal device takes advantage of a unique and unusual effect in cholesteric liquid crystals wherein pressure applied to the device with a pointed stylus, without applying a voltage, creates a transmissive texture having color reflective texture surroundings. One therefore has a dark image on a bright background opposite to that illustrated in FIG. 1.

U.S. Pat. No. 9,229,259 discloses a version of a writing device in which a single device is made up of a plurality of sub cholesteric liquid crystal writing tablets tiled together using an overlaid cover film. Each sub cholesteric liquid crystal writing tablet is able to be switched independently or all sub writing tablets switched together. However, the only way to tile the devices together is to laminate a film over the top of all sub writing tablets. This creates a small seam between each sub writing tablet and the adhesive attaching the overlayed laminate film can allow chemical substances that cause degradation of the liquid crystal to enter the seam, which results in a visible blue shift around the border of each sub writing tablet. In addition, the post processing required to laminate an overlayed film causes alignment constraints in the final device.

A split screen writing tablet, by Shenzhen Xinsheng Intelligent Technology Co., Ltd., was recently introduced in the market in China and Japan. This product, however, functions the same as two writing tablets tiled together such as described in the paragraph above in that each of two sub displays is erased with a separate switch. There are no electronic means to couple the two sub displays such that the full screen including both sub displays could be erased with one switch, for example. Another limitation of this product, similar to the tiled version, is that the liquid crystal layer is exposed at the seam in that the lower substrate adjacent to the conductive layer is also split leaving a seam or opening for chemical substances to reach the liquid crystal, which disadvantageously can cause a blue shift.

TECHNICAL SUMMARY OF THE DISCLOSURE

We disclose a writing device having sectional erase including regions of a liquid crystal layer including cholesteric liquid crystal material, which can be erased independently or in any combination. The writing device avoids all the issues involved in creating an open seam. The disclosed writing device has a substantially simplified construction with individual conductive sections and further optionally provides electronics that can couple the sections together. Numerous regions of the liquid crystal layer can be erased independently and optionally, more than one of the regions of the liquid crystal layer can be erased together. By erasing independently it is meant that one section can be erased while not erasing writing on other sections. For example, a single erase button can serve multiple functions such as erasing two different regions independently of one another or erasing different combinations of regions simultaneously depending upon an actuating sequence such as the number of times or duration of button presses. The writing device further eliminates the problem of blue shift in that the cholesteric liquid crystal layer is unexposed. None of the front substrate or back substrate includes separated sections. A sectional erase writing device brings to the user a more versatile writing device than the prior art discussed here, providing the user with multiple writing surfaces which can be erased with a variety of different erase schemes. Several embodiments to this disclosure are described.

In general, a first aspect of the disclosure features a writing device. The writing device includes a liquid crystal layer including reflective cholesteric liquid crystal material. There are electrically conductive layers between which the liquid crystal layer is disposed. At least one of the electrically conductive layers includes at least two conductive sections. There is a front substrate that is flexible and a back substrate between which the electrically conductive layers and the liquid crystal layer are disposed. Neither the front substrate nor the back substrate includes separated sections. Application of pressure to the front substrate changes a reflectivity of a portion of the cholesteric liquid crystal material to form an image. There is electronic erase circuitry including at least one actuator that independently applies an erase voltage waveform to each of at least two of the conductive sections.

Referring now to specific features of the first aspect of the disclosure, the front substrate and the back substrate include the electrically conductive layers disposed thereon and each of the front substrate and the back substrate forms a continuous surface throughout a viewing area of the writing device.

Another feature is that the at least one actuator includes at least one mechanical press switch. Another feature is that the at least one actuator includes at least one magnetically activated switch.

In another feature the conductive sections projected in a direction perpendicular from the front substrate or the back substrate toward an opposite side of the writing device form regions of the liquid crystal layer, respectively. Each one of the regions of the liquid crystal layer is erased when the erase voltage waveform is applied to a corresponding one of the conductive sections. Yet another feature is that one of the regions of the liquid crystal layer has a different reflective color than another of the regions of the liquid crystal layer.

In a further feature, the at least one actuator comprises a mechanical press switch and the at least one erase voltage waveform is applied to different conductive sections based on a number of times or durations by which the mechanical press switch is activated. Another feature is that the at least one actuator comprises a magnetically activated switch and the at least one erase voltage waveform is applied to different conductive sections based on a number of times or durations by which the magnetically activated switch is activated.

Another feature is wherein the at least one actuator comprises at least two actuators, wherein each of the actuators independently causes the electronic erase circuitry to apply the erase voltage waveform to a corresponding conductive section.

Still further, the writing device comprises at least three of the conductive sections.

Another feature is that the front substrate and the back substrate are the only two substrates of the writing device.

Still further, in a feature a light absorbing background absorbs light passing through the liquid crystal layer. Yet another feature is that the light absorbing background is opaque or semitransparent. Still further is the feature wherein the light absorbing background is comprised of an opaque or semitransparent back substrate.

A second aspect of the disclosure is directed to a writing device. The writing device includes a liquid crystal layer including reflective cholesteric liquid crystal material. There are electrically conductive layers between which the liquid crystal layer is disposed. At least one of the electrically conductive layers includes at least two conductive sections. There is a front substrate that is flexible and a back substrate between which the electrically conductive layers and the liquid crystal layer are disposed. Neither the front substrate nor the back substrate includes separated sections. Application of pressure to the front substrate changes a reflectivity of a portion of the cholesteric liquid crystal material to form an image. Electronic erase circuitry includes at least one actuator that independently applies an erase voltage waveform to each of the conductive sections, and that applies erase voltage waveforms to at least two of the conductive sections in combination.

Referring now to specific features of the second aspect of the disclosure, the at least one actuator includes a multifunctional actuator that causes the electronic erase circuitry to apply the erase voltage waveform to one of said conductive sections and independently causes said electronic erase circuitry to apply said erase voltage waveform to another of said conductive sections.

Another feature is that the at least one actuator includes a multifunctional actuator that causes the electronic erase circuitry to apply the erase voltage waveform to one of the conductive sections and independently causes the electronic erase circuitry to apply the erase voltage waveform to at least two of the conductive sections.

Still further, a feature is that the at least one actuator includes at least two monofunctional actuators, wherein each of the monofunctional actuators causes the electronic erase circuitry to apply the erase voltage waveform to only one of the conductive sections.

Yet another feature is wherein the at least one actuator includes a monofunctional actuator that causes the electronic erase circuitry to apply the erase voltage waveform to at least two of the conductive sections simultaneously.

A further feature is wherein the at least one actuator includes: a monofunctional actuator that causes the electronic erase circuitry to apply the erase voltage waveform to only one of the conductive sections; and a multifunctional actuator that causes the electronic erase circuitry to apply the erase voltage waveform to one of the conductive sections and independently causes the electronic erase circuitry to apply the erase voltage waveform to at least two of the conductive sections.

Another feature is a light absorbing background that absorbs light passing through the liquid crystal layer.

It should be understood that the above Summary of the Disclosure describes embodiments of the disclosure in broad terms while the following Detailed Description describes embodiments of the disclosure more narrowly and presents specific embodiments that should not be construed as necessary limitations of the invention as broadly defined in the claims. Many additional features, advantages and a fuller understanding of the disclosure will be had from the accompanying drawings and the Detailed Description that follows.

DETAILED DESCRIPTION

Figure 2:
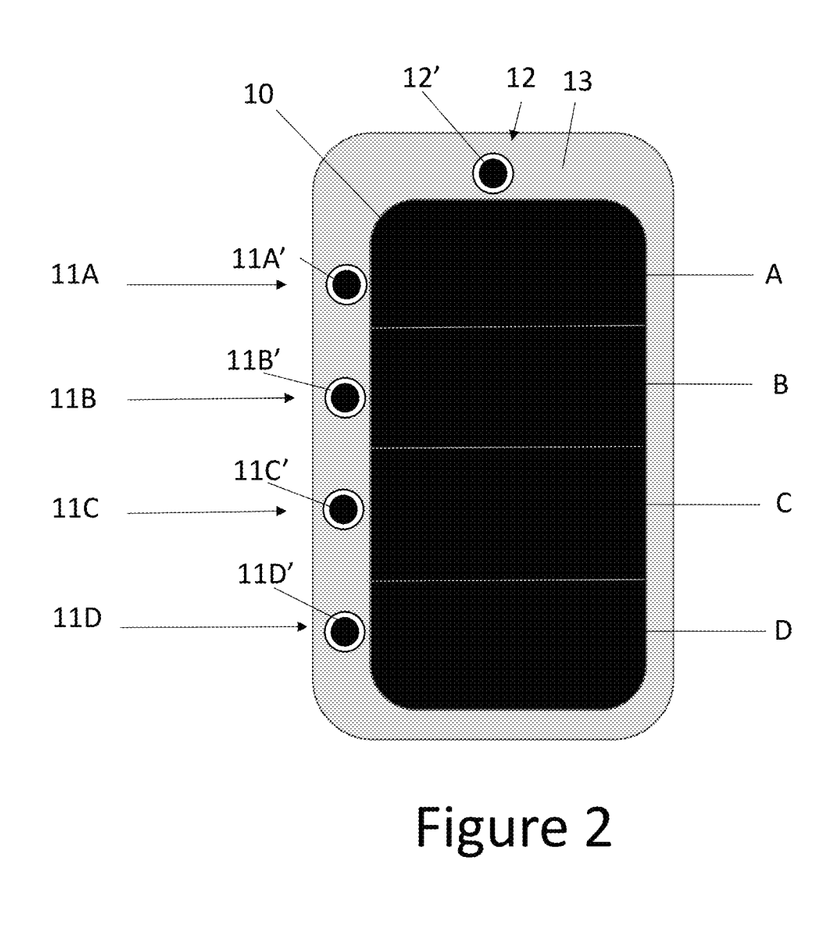
FIG. 2: Illustration of a front view of a writing device of this disclosure having sectional erase.

FIG. 2 illustrates an example of a writing device comprising four regions A, B, C, D of a liquid crystal layer including cholesteric liquid crystal material. The regions A, B, C and D of the liquid crystal layer are each independently erased by sectional switches 11A, 11B, 11C and 11D, respectively. Writing is erased only in the region corresponding to its sectional switch (i.e., the sectional switch closest to it). In one example, multiple regions of the liquid crystal layer are erased by any one of the sectional switches 11A, 11B, 11C or 11D, which are multifunctional. In another example, multiple regions of the liquid crystal layer are erased at once by optional switch 12 in the illustration. Any one or more of switches 11A, 11B, 11C or 11D and 12 can have multiple functions (i.e., to be multifunctional)—to erase one liquid crystal region or multiple liquid crystal regions.

Each switch described in this disclosure is activated at an activation area. Sectional switches 11A, 11B, 11C, 11D are associated with activation areas 11A', 11B', 11C', 11D', respectively (FIG. 2). An example of one activation area is a push button. An example of another activation area is a surface with indicia on it indicating where to place a magnet in proximity to a magnetically activated switch disposed in the housing below the indicia. All switches are mounted in housing 13 of the writing device so that the activation area is exposed on an external part of the writing device. Any number of regions are possible with four regions A, B, C, D of the liquid crystal layer being illustrated in FIG. 2. Other types of switches such as a capacitive activated touch switch might also be employed.

Figures 3A, 3B:
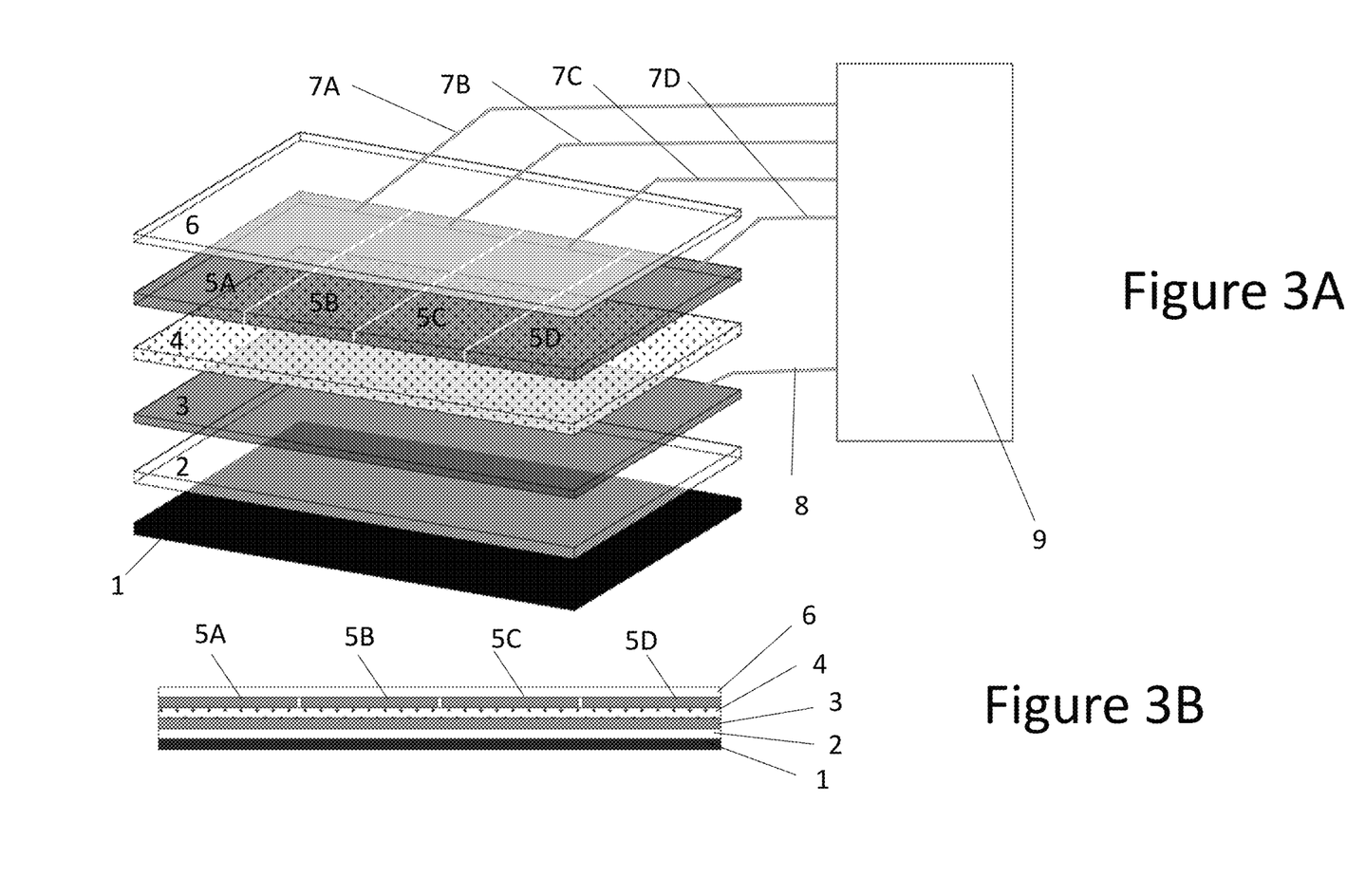
FIG. 3A: Illustration of an exploded view of the components of the writing device of this disclosure.
FIG. 3B: Illustration of a side view of the components of the writing device of FIG. 3A.

Referring to the exploded perspective view of FIG. 3A as well as the side view of FIG. 3B, in this particular example, a light absorbing background 1 in the form of a layer is disposed on the back substrate 2 which is transparent and comprised of polymer. The back substrate 2 is coated on its other surface with a back electrically conductive layer 3, which is transparent. Light absorbing background 1 can also be patterned as described in U.S. Pat. No. 9,235,075. The writing device, which is pressure sensitive, includes a liquid crystal layer 4 including a cured dispersion of cholesteric liquid crystal, polymer and spacers. Another component of the writing device is a front substrate 6 which is transparent and comprised of polymer. The front substrate 6 is coated on an inner surface with a front electrically conductive layer that is transparent and is separated into conductive layer sections 5A, 5B, 5C and 5D. This sectioning of the electrically conductive layer can be achieved by known methods such as ablation, chemical or optical deactivation or simply patterning the electrically conductive layer. There may be a physical gap or space (e.g., air gap) between adjacent conductive sections in the plane of the electrically conductive layer, or a material or treatment of the material between the adjacent conductive sections.

The liquid crystal layer 4 may be multicolored as disclosed in U.S. Pat. No. 9,927,672, including sub regions of cholesteric liquid crystal spaced from each other in an xy plane but each sub region extending for the same liquid crystal layer thickness in the z plane perpendicular to the substrates. The sub regions together form a continuous layer (i.e., without separate sections in the liquid crystal layer). The cholesteric liquid crystal reflects different wavelengths of light in different sub regions. In particular examples, each region of the liquid crystal layer, as defined relative to the projection of the conductive sections, can be a different color than other regions (each region in effect being a sub region), or at least one region of the liquid crystal layer can include the different color sub regions. The sub regions might also differ from each other in certain characteristics described in the U.S. Pat. No. 9,927,672, including line width and brightness.

The exploded view of FIG. 3A illustrates the same layers as the side view of FIG. 3B with the conductive sections 5A, 5B, 5C, and 5D, which are transparent, being visible in their locations underneath front substrate 6, which is transparent.

As illustrated in the exploded view of FIG. 3A, the conductive sections 5A, 5B, 5C, and 5D are connected to erase electronics 9 by electrical conductors 7A, 7B, 7C, 7D, respectively. The back electrically conductive layer 3, which is continuous, extends for substantially the entire viewing area of the writing device and is connected to the erase electronics 9 by electrical conductor 8. When a sectional switch 11A, 11B, 11C or 11D is activated, an image on the front view of the writing device (see FIG. 2) in one of regions A, B, C, and D of the liquid crystal layer is erased. Activating a sectional switch 11A, 11B, 11C or 11D causes the erase electronics 9 to apply an erase voltage waveform to one of the conductive sections 5A, 5B, 5C or 5D, which erases an image on the corresponding regions A, B, C or D of the liquid crystal layer. For example, activating sectional switch 11A independently erases region A of the liquid crystal layer; activating sectional switch 11C independently erases region C of the liquid crystal layer, etc.

Sectional switches 11A, 11B, 11C, and 11D can also be multifunctional, wherein one region of the liquid crystal layer and a combination of regions of the liquid crystal layer are erased. This can be achieved, for example, as selected by a number of times the button is pressed when the erase electronics is programmed to do so. At least one erase voltage waveform can be applied to different conductive sections based on a number of times or durations by which the mechanical press switch is activated. At least one erase voltage waveform can be applied to different conductive sections based on a number of times or durations by which a magnetically activated switch is activated. Other ways can be used to instruct erasing combinations of regions of the liquid crystal layer, such as a short press to erase the adjacent region of the liquid crystal layer followed by short taps to erase further regions of the liquid crystal layer by number of taps. For example, one short tap on sectional switch 11B could erase the region of the liquid crystal layer adjacent to the sectional switch (e.g., region B); whereas a short tap, followed by a hold, and then two short taps, also erases regions A and C of the liquid crystal layer. An optional activating switch 12 could be employed that erases all regions of the liquid crystal layer at the same time as in Example 1. If switch 12 is multifunctional it could be made to erase regions of the liquid crystal layer independently as well as combinations of regions of the liquid crystal layer (any combination of two, three or four or more regions of the liquid crystal layer).

One product design may include a multifunctional actuator (or more than one) that applies the erase voltage waveform to one conductive section and independently applies the erase voltage waveform to at least two conductive sections. More specifically, a device may include only one multifunctional actuator that applies the erase voltage waveform to each of the conductive sections independently or in combination. Another product design may include at least one monofunctional actuator, each of which applies the erase voltage waveform to only one conductive section, and a multifunctional actuator that applies the erase voltage waveform to one conductive section and independently applies the erase voltage waveform to at least two conductive sections. Other variations in switch function, operation and design that would be apparent to one of ordinary skill in the art are within the spirit and scope of this disclosure. Moreover, throughout this disclosure it will be apparent that covered within the spirit and scope of this disclosure are actuators, which may or may not considered to be switches, that can be activated to result in sectional erase, multiple erase and/or the multifunctional erase. The words switch and actuator are used in this disclosure but should not be interpreted to unduly limit the scope of this disclosure, a switch being considered as one type of actuator. Wherever a switch is discussed in this disclosure it should be appreciated that other actuators could be used. Whenever one actuator is indicated in the disclosure, multiple such actuators may be used.

It is to be noted that the role of the electrically conductive layers could be reversed wherein the front electrically conductive layer adjacent to the front substrate 6 is continuous, covering substantially the entire viewing area of the display, and is connected to the erase electronics 9 with conductor 8. The back electrically conductive layer 3 adjacent to the back substrate 2 is sectioned with each conductive section 5A, 5B, 5C, 5D separately connected to erase electronics 9 with conductors 7A, 7B, 7C and 7D, respectively. The role of erase electronics 9 in either case is, when activated by a switch to apply a suitable erase voltage waveform, to erase an image on one region of the liquid crystal layer and on multiple regions of the liquid crystal layer.

While the above example illustrates four regions of the liquid crystal layer it is to be understood that any number of regions of the liquid crystal layer, two or more, are possible in the writing device with each region of the liquid crystal layer being erased independently of the others. In particular, the writing device could include two regions, three regions, four regions, five regions, six regions, seven regions, eight regions, nine regions or ten or more regions, of the liquid crystal layer. Each region could also include at least one subregion or at least two or more subregions, the subregions being continuous with each other (without spacing between them in the plane of the subregions). It is to be further noted that the writing device enables multiple regions of the liquid crystal layer to be erased by one or more of: at least one monofunctional actuator, at least one multifunctional actuator, and/or by an optional full erase actuator that erases the entire viewing region, and combinations thereof. Other known actuators may also be used along with the actuators described above.

Erase voltage waveforms for erasing are described in U.S. Pat. No. 10,558,065, which is incorporated herein by reference in its entirety. Any of the waveforms of the prior art of cholesteric liquid crystal writing devices may be used to erase each region of the liquid crystal layer or multiple regions of the liquid crystal layer. The most common waveform that may be used includes voltage pulses of alternating polarity that removes both the cholesteric planar and focal conic textures then followed by pulses that leave the cholesteric material in the focal conic texture. Pulses of alternating polarity are desired to avoid ionic conductivity damage to the writing device. The waveform may not require the voltage pulses if it is not desired to have a complete erase. However, pulses are advantageously used for a better erase and to avoid ghosting. Another voltage waveform termed a slow discharge erase waveform is also disclosed in U.S. Pat. No. 10,558,065, and includes a portion of the voltage waveform that applies a voltage to remove the planar and focal conic textures followed by a slow decay portion in which the charge on the writing device becomes discharged driving the writing device into the focal conic texture. Any of the erasing waveforms may be applied by the electronics of the stylus. The Example described later uses the slow discharge waveform.

Figure 4:
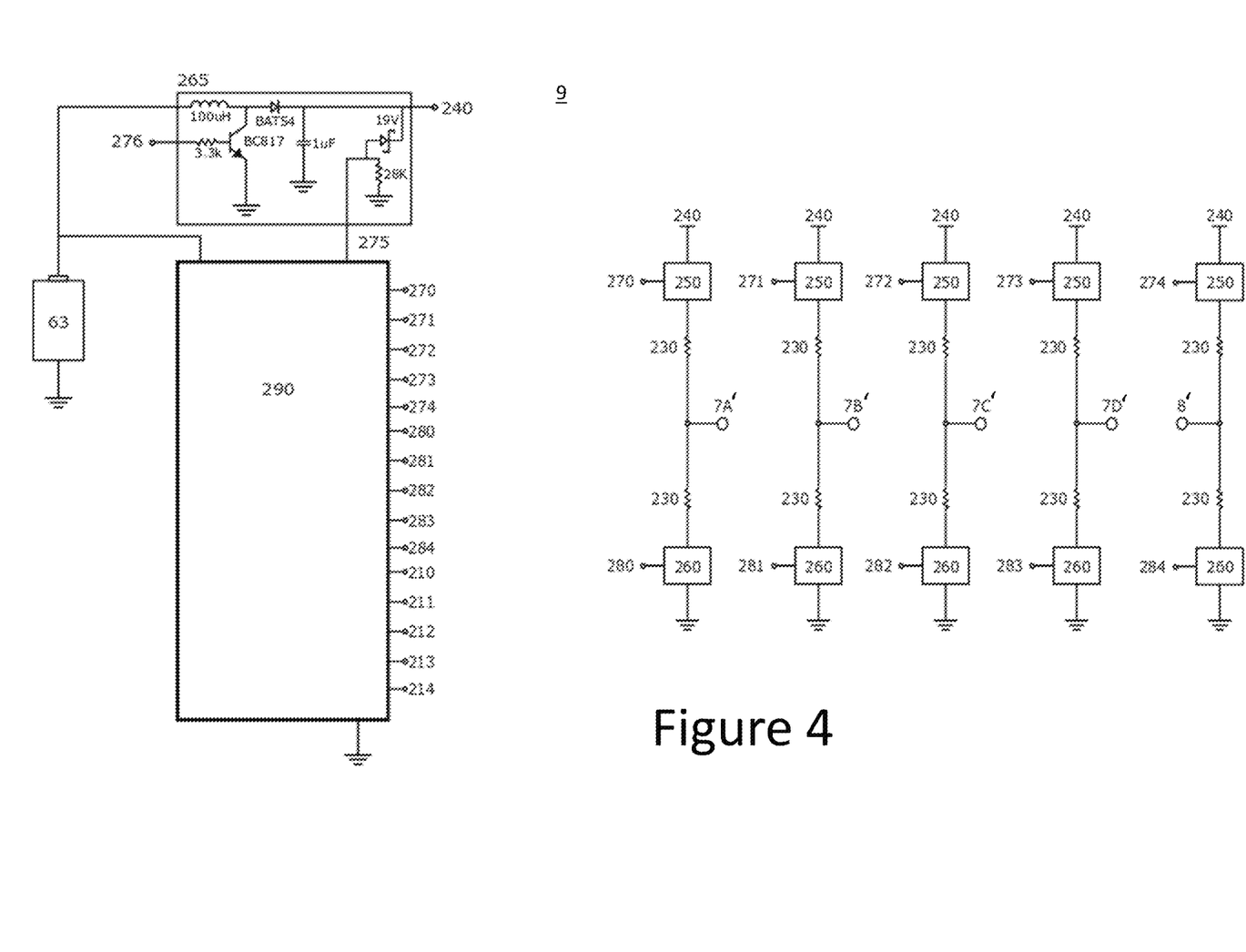
FIG. 4: Schematic circuitry of this disclosure for erasing regions of a liquid crystal layer of the writing device.
Figure 5A:
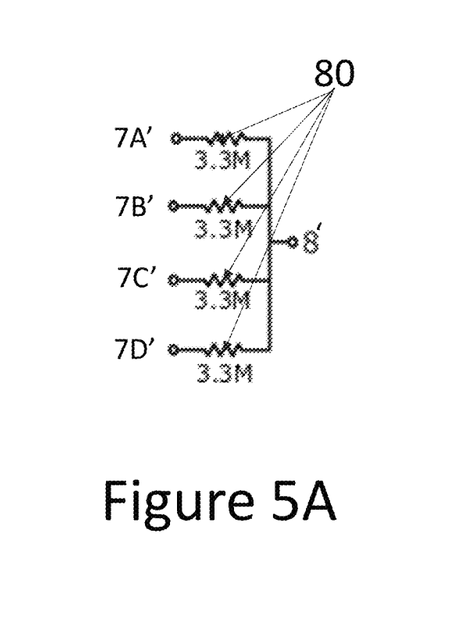
FIG. 5A: Schematic circuitry of this disclosure for switch locations in the writing device.
Figure 5B:
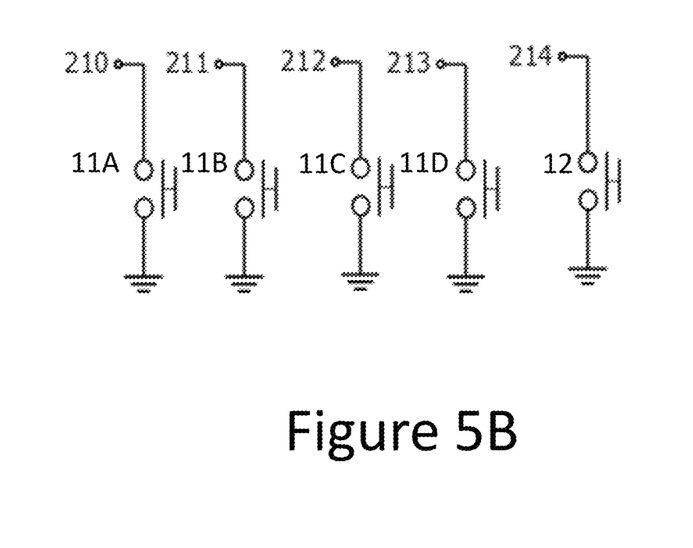
FIG. 5B: Schematic circuitry of this disclosure for sectional switches and a switch erasing multiple liquid crystal regions of the writing device.

FIGS. 4, 5A and 5B show electronic schematic diagrams of erase electronics 9 that can be used to apply an erase voltage waveform for the example of a writing device with four regions A, B, C, and D of the liquid crystal layer 4.

Terminals 7A', 7B', 7C', 7D' and 8' of FIG. 4 are connected to electrical conductors 7A, 7B, 7C, 7D, and 8 of FIG. 3, respectively. High-side drivers 250 are provided to connect terminals 7A', 7B', 7C', 7D', and 8' to voltage supply 240 as is known in the art (see for example U.S. Pat. No. 10,558, 065). Low-side drivers 260 are provided to connect the terminals 7A', 7B', 7C', 7D', and 8' to ground. Current limiting resistors 230 (optional) are included. Control signals 270 through 284 are output from microprocessor 290 and are sequenced to enable/disable the drivers to produce the required drive waveforms to terminals 7A', 7B', 7C', 7D' and 8'. Implementations of voltage supply 240 and control logic for sequencing control signals 270 to 284 are well-known in the art. Power is supplied by power source 63. The microcontroller 290 additionally controls the step-up converter 265 to generate a suitable level of voltage supply 240. If the voltage at voltage supply 240 is less than the voltage level required, then the microcontroller 290 provides a PWM signal to step-up converter input 276 until the voltage at voltage supply 240 is greater than or equal to the voltage level required.

FIG. 5B illustrates circuitry for sectional switches 11A, 11B, 11C, 11D, and switch 12 in the example of a writing device with four regions of the liquid crystal layer. The switches can be mechanical push button activated switches, magnetically activated switches, or any another type of switch such as a capacitive activated touch switch that could also be employed. In the Example, described later, magnetically activated switches are used. FIG. 5A illustrates optional resistors 80 that may be employed which are connected between terminals 7A', 7B', 7C', 7D' and terminal 8' as indicated in FIG. 5A. The resistors may be used for multiple purposes. In the case where the slow discharge waveform is implemented, the resistor may be used for discharging the display as known in prior art. In the case where the stylus contains the erase electronics, discussed in the next paragraph, the resistor may be used for automatically detecting the contact of the stylus terminals with terminals on the writing device (U.S. patent application Ser. No. 17/168,507). FIGS. 4, 5A and 5B illustrate switch 12 for applying erase voltage waveforms to all conductive sections 5A, 5B, 5C, and 5D all together with one button. However, the circuitry and or firmware could be arranged or modified so that any combination of regions of the liquid crystal layer could be selected to multiply erase together (one after the next or all at the same time) with a single button press, a sequence of button presses, durations of button presses or other variations.

Another variation can design the sectional switches such that each one can erase the region of the liquid crystal layer corresponding to it and all regions of the liquid crystal layer above or below it relative to the front view of FIG. 2. For example, pressing sectional switch 11C one time erases region C, but pressing sectional switch 11C once, followed by a hold and then one or more presses also erases all regions above it, A and B. Or in another variation one can just hold sectional switch 11C for a longer time, which erases all of regions A, B and C at the same time. Many other variations in the function, structure and operation of switches and actuators would be apparent to those of ordinary skill in the art in view of this disclosure and fall within its spirit and scope.

Another form of erasing the sectioned writing tablet is possible wherein the erase electronics 9 of FIG. 4 are contained within the stylus. With stylus erase, in the example of a writing device with four regions of the liquid crystal layer, the activation areas, buttons 11A', 11B', 11C', and 11D' in FIG. 2, are replaced by terminals on housing 13 (as disclosed in U.S. patent application Ser. No. 17/380,812, which is incorporated by reference). Optional resistors of FIG. 5A are also located within the housing 13. As further disclosed in that patent application, the circuitry could be adjusted to allow the stylus to detect when electrical contact is made with the terminals on housing with terminals on the stylus so that the erase voltage waveform is automatically applied to erase an image.

It is to be understood that methods for erasing one or multiple regions of the liquid crystal layer, or erasing all regions at once, are possible using optional switch 12 or another multifunctional switch. Use of the microprocessor to make switches multi-functional offers convenience, flexibility and possibly cost in achieving a wide range of switching possibilities.

The disclosure will now be described by reference to the following example, which include specific features that should not be considered to be necessary limitations of the disclosure as described in the claims.

Example 1

A working prototype was made by modifying the cholesteric liquid crystal display type used in a commercially available Boogie Board Dash™ (WT18234) of Kent Displays, Inc. by sectioning, during construction, one of the electrodes into seven equally spaced conductive sections. The slow discharge erase waveform (U.S. Pat. No. 10,558, 065) was implemented using a microprocessor of Holtek HT66F3195, the same type as 290 of FIG. 3. The microprocessor accommodated applying the erase voltage waveform to the seven conductive sections independently each with a sectional magnetically activated switch. The microprocessor also accommodated applying erase voltage waveforms to all seven conductive sections together using a full erase magnetically activated switch. High side drivers 250 and low side drivers 260 as well as the values of resistors 230 were identical to those used in the Boogie Board Dash™ (WT18234) product. Values for components of voltage source 240 were those indicated in FIG. 4. Power source 63 consisted of two AAA batteries connected in series for an output of 3V. The resistors 80 across the terminals of the writing tablet prototype had a resistance of 3.3 mega ohms (MΩ). The microcontroller 290 additionally controlled the step-up converter 265 to generate erase voltages for voltage supply 240.

Writing on a region of the liquid crystal layer corresponding to one of the conductive sections was erased by moving a magnet into proximity to an adjacent sectional, magnetically activated sectional switch. This activated the sectional switch, signaling the microprocessor 290 to control the step up converter 265 to generate the erase voltage waveform 240. The microprocessor also activated the high side driver 250 and/or low side driver 260 in connection with one of the terminals leading to a conductive section of the front electrically conductive layer and the terminal leading to the back electrically conductive layer. This enabled the erase voltage waveform 240 to be applied to the particular conductive section. This erased the region of the liquid crystal layer corresponding to that particular conductive section.

Writing on multiple regions of the liquid crystal layer was erased all at the same time by moving the magnet into proximity with the full erase magnetically activated switch 12. This signal enabled the microprocessor to control the step up converter 265 to generate the slow erase voltage waveform 240. The microprocessor also activated all of the high side drivers 250 and/or low side drivers 260 in connection with all of the terminals leading to all of the conductive sections of the front electrically conductive layer and the terminal leading to the back electrically conductive layer. This enabled the erase voltage waveform 240 to be applied to all of the conductive sections. This erased all regions of the liquid crystal layer.

Example 2

The working prototype of Example 1 was modified so that one of the switches had multiple functions by switching one of the sections separately as well as being used to switch several sections together. In this example, microprocessor, Holtek HT66F3165, was programmed to switch a single section by a placing the magnet in proximity of the magnetically activated switch for a short period of time. The same magnetic switch could switch the same section as well as sections above and below together by placing the magnet in proximity of the magnetically activated switch for a longer period of time.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A writing device comprising:
   a liquid crystal layer including reflective cholesteric liquid crystal material;
   electrically conductive layers between which said liquid crystal layer is disposed, at least one of said electrically conductive layers includes conductive sections there being at least two of said conductive sections;
   a front substrate that is flexible and a back substrate between which said electrically conductive layers and said liquid crystal layer are disposed;
   wherein neither said front substrate nor said back substrate includes separated sections;
   wherein application of pressure to said front substrate changes a reflectivity of a portion of said cholesteric liquid crystal material to form an image; and
   electronic erase circuitry including at least one actuator that independently applies an erase voltage waveform to each of at least two of said conductive sections.

2. The writing device of claim 1 wherein said front substrate and said back substrate include said electrically conductive layers disposed thereon and each of said front substrate and said back substrate forms a continuous surface throughout a viewing area of said writing device.

3. The writing device of claim 1 wherein said at least one actuator includes at least one mechanical press switch.

4. The writing device of claim 1 wherein said at least one actuator includes at least one magnetically activated switch.

5. The writing device of claim 1 wherein said conductive sections projected in a direction perpendicular from said front substrate or said back substrate toward an opposite side of said writing device form regions of said liquid crystal layer, respectively, and each one of said regions of said liquid crystal layer is erased when said erase voltage waveform is applied to a corresponding one of said conductive sections.

6. The writing device of claim 5 wherein one of said regions of said liquid crystal layer has a different reflective color than another said of said regions of said liquid crystal layer.

7. The writing device of claim 1 wherein said at least one actuator comprises a mechanical press switch and said at least one erase voltage waveform is applied to different said conductive sections based on a number of times or durations by which said mechanical press switch is activated.

8. The writing device of claim 1 wherein said at least one actuator comprises a magnetically activated switch and said at least one erase voltage waveform is applied to different said conductive sections based on a number of times or durations by which said magnetically activated switch is activated.

9. The writing device of claim 1 wherein said at least one actuator comprises at least two actuators, wherein each of said actuators independently causes said electronic erase circuitry to apply said erase voltage waveform to a corresponding said conductive section.

10. The writing device of claim 1 comprising at least three of said conductive sections.

11. The writing device of claim 1 wherein said front substrate and said back substrate are the only two substrates of said writing device.

12. The writing device of claim 1 comprising a light absorbing background that absorbs light passing through said liquid crystal layer.

13. The writing device of claim 12 wherein said light absorbing background is opaque or semitransparent.

14. The writing device of claim 12 wherein said light absorbing background is comprised of an opaque or semitransparent said back substrate.

15. A writing device comprising:
a liquid crystal layer including reflective cholesteric liquid crystal material;
electrically conductive layers between which said liquid crystal layer is disposed, at least one of said electrically conductive layers includes conductive sections, there being at least two of said conductive sections;
a front substrate that is flexible and a back substrate between which said electrically conductive layers and said liquid crystal layer are disposed;
wherein neither said front substrate nor said back substrate includes separated sections;
wherein application of pressure to said front substrate changes a reflectivity of a portion of said cholesteric liquid crystal material to form an image; and
electronic erase circuitry including at least one actuator that independently applies an erase voltage waveform to each of said conductive sections, and that applies erase voltage waveforms to at least two of said conductive sections in combination.

16. The writing device of claim 15 wherein said at least one actuator includes a multifunctional actuator that causes said electronic erase circuitry to apply said erase voltage waveform to one of said conductive sections and independently causes said electronic erase circuitry to apply said erase voltage waveform to another of said conductive sections.

17. The writing device of claim 15 wherein said at least one actuator includes a multifunctional actuator that causes said electronic erase circuitry to apply said erase voltage waveform to one of said conductive sections and independently causes said electronic erase circuitry to apply said erase voltage waveform to at least two of said conductive sections.

18. The writing device of claim 15 wherein said at least one actuator includes at least two monofunctional actuators, wherein each of said monofunctional actuators causes said electronic erase circuitry to apply said erase voltage waveform to only one of said conductive sections.

19. The writing device of claim 15 wherein said at least one actuator includes a monofunctional actuator that causes said electronic erase circuitry to apply said erase voltage waveform to at least two of said conductive sections simultaneously.

20. The writing device of claim 15 wherein said at least one actuator includes: a monofunctional actuator that causes said electronic erase circuitry to apply said erase voltage waveform to only one of said conductive sections; and a multifunctional actuator that causes said electronic erase circuitry to apply said erase voltage waveform to one of said conductive sections and independently causes said electronic erase circuitry to apply said erase voltage waveform to at least two of said conductive sections.

21. The writing device of claim 15 comprising a light absorbing background that absorbs light passing through said liquid crystal layer.

* * * * *